United States Patent [19]

Groening

[11] 3,761,576

[45] Sept. 25, 1973

[54] PREPARATION OF TITANIUM CARBIDE
[75] Inventor: Franklin E. Groening, Akron, Ohio
[73] Assignee: PPG Industries, Inc., Pittsburgh, Pa.
[22] Filed: Aug. 24, 1970
[21] Appl. No.: 66,175

[52] U.S. Cl. ............................. 423/440, 29/182.8
[51] Int. Cl. ..................... C01b 31/30, C22b 29/00
[58] Field of Search ....................... 23/208; 423/440

[56] References Cited
UNITED STATES PATENTS

| | | | |
|---|---|---|---|
| 3,340,020 | 9/1967 | Neuenschwander et al.. | 23/208 A X |
| 3,253,886 | 5/1966 | Lamprey et al............. | 23/208 A X |
| 3,525,595 | 8/1970 | Zirngibl et al. ............. | 23/202 V X |
| 3,485,586 | 7/1969 | Swaney................................ | 23/208 |

*Primary Examiner*—M. Weissman
*Attorney*—Chisholm and Spencer

[57] ABSTRACT

Titanium carbide, predominantly in the form of submicron small cubic crystals, is formed by reacting, in the vapor state, titanium halide, reducing agent and carbon source at carbide-forming temperatures. High surface area titanium carbide is produced by establishing a stream of hot hydrogen and introducing titanium halide into said hydrogen stream at a point upstream of the point at which the carbon source is introduced into the hydrogen stream. When the order of introduction is reversed, the titanium carbide product surface area decreases.

8 Claims, 3 Drawing Figures

INVENTOR
FRANKLIN E. GROENING

PREPARATION OF TITANIUM CARBIDE

DESCRIPTION OF THE INVENTION

Titanium carbide can be produced by interreacting in the vapor phase a source of carbon, such as methane, a volatile halide of titanium, such as titanium tetrachloride, and a reducing agent, such as aluminum, hydrogen or combinations thereof, in an enclosed reaction zone at carbide-forming temperatures. See, for example, U. S. Pat. Nos. 2,952,598, 3,205,042, 3,340,020, 3,346,338 and 3,485,586. Average reaction (carbide forming) temperatures are normally above 1,500° C. and usually range from about 1,500° C. to about 4,000° C. or above.

In a convenient method of producing titanium carbide in this manner, hydrogen is passed through a plasma generator, e.g., an induction gas heater, an electric arc gas heater, or other suitable gas heater with the result that the temperature of the hydrogen is raised to a very high temperature, for example, above 1,500° C., and usually in the range of from 2,000° to 4,000° C. The heated hydrogen flows outwardly from the heating zone in the form of a luminescent gas stream (plasma) or flame. Vaporous titanium tetrachloride and methane are then injected into the hot hydrogen stream or flame or at least into the environment thereof and the resulting gas mixture forwarded to the interior of a suitable reactor.

It has now been found surprisingly that when the titanium halide reactant is introduced against the hot hydrogen stream at a point upstream of the point of introduction of the carbon source, titanium carbide of higher surface area (smaller particle size) is produced than when the sequence of reactant introduction is reversed, i.e., contacting the hydrogen stream with the carbon source before the titanium halide reactant. This discovery is applicable to the production of titanium carbide having a weight average particle size in the range of from about 0.04 to about 0.9 micron, especially from 0.04 to 0.3 micron.

BRIEF DESCRIPTION OF THE DRAWINGS

Typical equipment that can be used in the practice of the present invention is diagrammatically illustrated in the accompanying drawings wherein.

DETAILED DESCRIPTION

Figure 1:
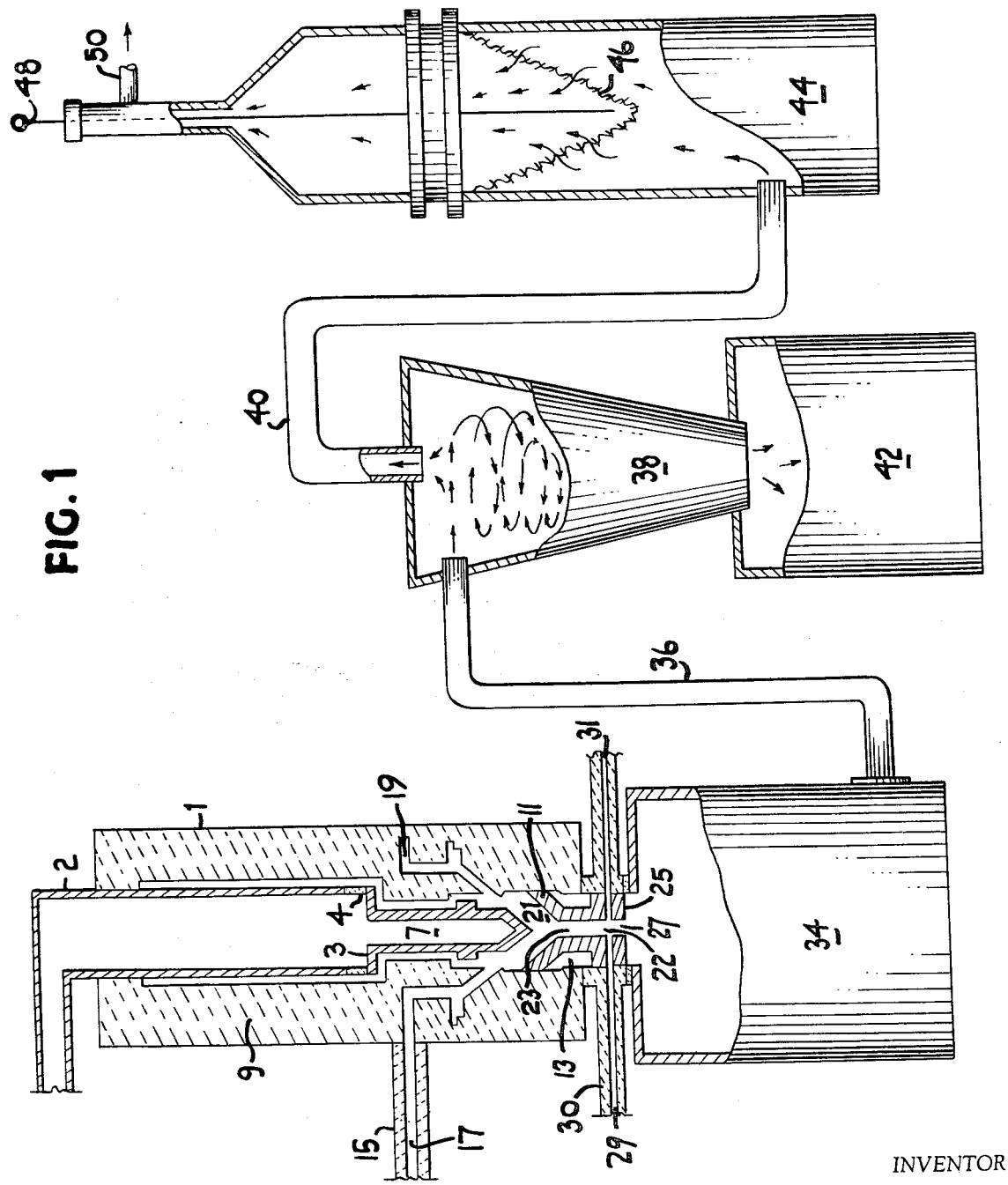
FIG. 1 is a diagram of an assemblage, partially broken away in section, comprising the gas heating system or arc plasma generator, mixer means for introducing reactant to the plasma stream emanating from the plasma generator, reactor means, and auxiliary equipment means (cyclone and bag filter) for recovering the titanium carbide product suspended in the reactor discharge.

Typical of the titanium halides that can be employed in the present process include: titanium tetrachloride, titanium tetrabromide, titanium tetraiodide, and titanium tetrafluoride, as well as subhalides of titanium, such as titanium dichloride, titanium trichloride and titanium trifluoride. Of course, subhalides other than the subchlorides and subfluorides can be used in the same manner. Further, mixtures of halides, such as the chlorides and the bromides, can be employed as the titanium halide reactant. As the reducing agent, aluminum, hydrogen, or combinations thereof can be used. Most typically, hydrogen alone is used.

In the aforesaid process, volatile hydrocarbons, halogenated hydrocarbons or mixtures of such compounds can be used as the source of carbon. As used herein, the term "halogenated hydrocarbon", e.g., "chlorinated hydrocarbon", is intended to mean and include both compounds of carbon, halogen and hydrogen and compounds of carbon and halogen, e.g., carbon tetrachloride. Typical of hydrocarbons that can be used as the carbon source include the normally gaseous or liquid but relatively volatile hydrocarbons including saturated and unsaturated $C_1 - C_{12}$ hydrocarbons, such as methane, ethane, propane, the butanes, the pentanes, decanes, dodecanes, ethylene, propylene, the butylenes and amylenes, symmetrical dimethylethylene and like alkenes, cycloaliphatic and aromatic hydrocarbons, such as cyclopentane, cyclohexane, toluene, benzene, etc., acetylenic compounds of which may be noted acetylene, methyl acetylene, ethyl acetylene, and dimethyl acetylene. Methane or propane are economically preferred for this purpose. Rarely are hydrocarbons of more than twelve carbons used.

Examples of halogenated hydrocarbons that can be used as the source of carbon in the process described herein include compounds containing from one to twelve, more usually one to eight, carbon atoms, such as methyl chloride, chloroform, methylene chloride, carbon tetrachloride, dichlorodifluoromethane, amyl chloride, chloroethane, vinyl chloride, 1,1-dichloroethylene, 1,2-dichloroethylene, 1,1-dichloroethane, 1,2-dichloroethane, ethylene dibromide, trichloroethylene, perchloroethylene, propylene dichloride, 1,1,2-trichloroethane, 1,1,1-trichloroethane, 1,1,1,2- and 1,1,2,2-tetrachloroethane, hexachloroethane, and like aliphatic chlorides, fluorides, bromides, or iodides containing up to about 12 carbon atoms, most preferably up to about six carbon atoms. Aromatic halocarbon compounds, e.g., chlorocarbon compounds, also can be used. Such compounds include $C_6 - C_9$ halogenated aromatic compounds, such as monochlorobenzene, orthodichlorobenzene, paradichlorobenzene and the like. Cycloaliphatic halides, such as the $C_5 - C_6$ aliphatic halides, e.g., chlorinated cyclopentadiene, cyclohexylchloride, etc., can also be used.

Typically, the above-described hydrocarbons and halogenated hydrocarbons should be readily vaporizable (volatile) without tar formation since otherwise unnecessary difficulties which are unrelated to the process itself can arise, such as plugging of lines by decomposition and/or polymerization products produced in the course of vaporizing the hydrocarbons.

The amount of reducing agent, e.g., hydrogen, utilized in the above-described process should be at least that amount which is required stoichiometrically to satisfy the theoretical demand of the reaction. Typically, the amount of hydrogen used is in excess of the theoretical amount. When the titanium halide used is titanium tetrachloride, and a chlorinated hydrocarbon is used as the source of carbon, the theoretical amount or demand of hydrogen required can be expressed by the equation, $$n\text{TiCl}_4 + C_nH_mCl_x + (2n+\tfrac{1}{2}x-\tfrac{1}{2}m)H_2 \rightarrow n\text{TiC} + (4n+x)\text{HCl}$$

wherein:
n reflects the number of carbon atoms,
m reflects the number of hydrogen atoms, and
X reflects the number of chlorine atoms
in the compound of chlorine and carbon used. Similarly, when other titanium halides are used, the amount of elemental hydrogen used should be in excess of the chemical equivalent of the halogen of the titanium halide. Often, the amount of hydrogen utilized will be in excess of ten times and as high as 100 times the amount of hydrogen shown to be required by the above equation or required to equal the chemical equivalence of halogen of the titanium halide.

The amount of hydrocarbon or halogenated hydrocarbon used as the source of carbon in the above-described process is also used in at least stoichiometric quantities of the amount required by the above equation or required to equal the chemical equivalence of the titanium halide. Usually, at least 5 percent and often as much as 50 to 150 or 300 percent in excess of the amount required by the above equation is used.

Any convenient method for bringing the respective reactants to reaction (carbide forming) temperatures can be used. Thus, for example, all of the reactants can be heated individually to or above reaction temperature and then admixed in a suitable reaction zone; or, one or more but not all of the reactants can be heated to temperatures in excess of reaction temperature and admixed in the reaction zone with the remaining reactant(s) which have been introduced into the reaction zone at temperatures below reaction temperature. The highly heated reactant(s) bring the remaining reactant(s) to reaction temperature quickly and causes formation of the titanium carbide. Preferably, the latter scheme is used.

As indicated above, temperatures at which the production of titanium carbide by vapor phase reduction of titanium halide is conducted typically are normally above 1,500° C. and usually range from about 1,500° C. to about 4,000° C. or above. The reaction can be conducted at subatmospheric, atmospheric or superatmospheric pressures. Typically, pressures from about 2 to about 25 p.s.i.g. are used.

The equipment utilized in the aforementioned method for producing titanium carbide (as more specifically described hereinafter) is constructed from materials of construction resistant to the temperatures and corrosive environment existing during the various steps of the procedure, as outlined hereinafter.

The present invention will be more fully understood by reference to the accompanying drawings. Referring now to FIG. 1, there is shown apparatus comprising a plasma generator (arc heater) 1 mounted atop reactant mixer means 30 which, in turn, is mounted atop reactor 34. Although the aforesaid apparatus is shown in vertical alignment, other alignments away from the vertical including a horizontal alignment are contemplated. Plasma generator 1 consists essentially of an annular anode 11 which is aligned coaxially with cathode rod 3. Both anode and cathode are mounted in a cylindrical base 9 which is electrically nonconductive. In the embodiment illustrated, the cathode rod tapers conically at its end essentially to a point. The anode and cathode are constructed out of conventional electrode type materials, such as copper, tungsten, etc. The cathode often has a thoriated tungsten tip or inserts which assist in cooling of the cathode.

As is conventional with plasma generators, the anode is surrounded by an annular cooling chamber 13 through which water or other cooling medium can be circulated by means not shown in order to hold the anode at a suitably low temperature and prevent undue erosion thereof. In a similar manner, the interior of the cathode is provided with cooling chamber 7 and with means (not shown) to circulate water or other suitable cooling fluid therein in order to hold the cathode at a suitable operating temperature. As shown, cathode 3 is separated from tube 2 by insulation means 4. Tube 2 serves to help support and align cathode rod 3 and provide a conduit for coolant flow. Cathode 3 can be provided with means for moving it in a vertical direction so that the distance between cathode 3 and anode 11 can be varied.

The anode and cathode are axially aligned but spaced longitudinally to provide annular space 21 which tapers conically to a coaxial outlet conduit 23. The assemblage is also provided with arc or work gas inlet means 15 having conduit 17 which communicates through an annular conical conduit 19 with the gas space 21. The cathode and anode are connected by electrical means (not shown) to a power supply (not shown). Typically, the power source is a direct current power source, although alternating current can be employed. The assemblage is also provided with nozzle means 25 having a conduit 27 which is coaxially aligned with outlet conduit 23 of anode 11. Nozzle 25 can be eliminated, whereupon the anode serves also as the nozzle.

Figure 2:
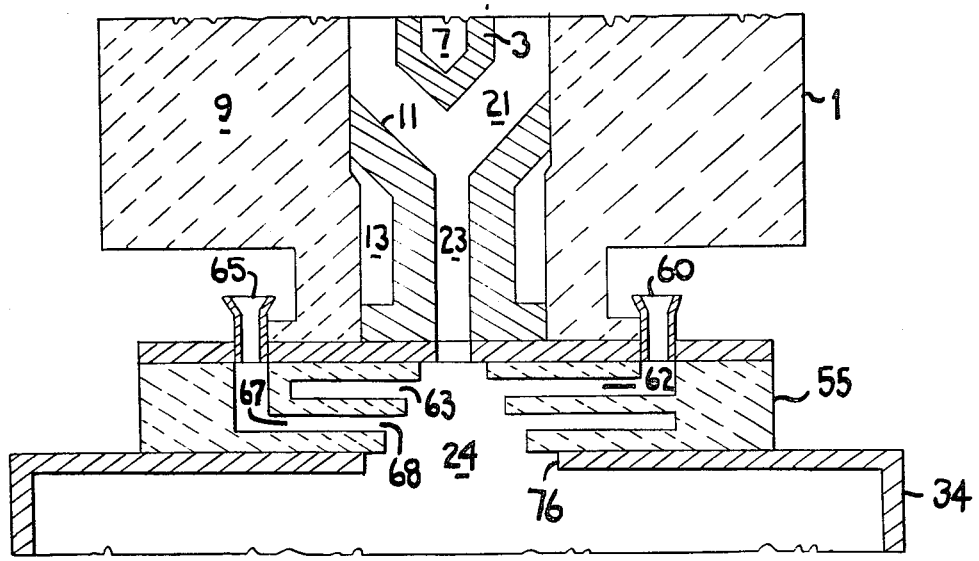
FIG. 2 is a diagrammatic sectional view of the lower portion of the plasma generator and upper portion of the reactor of FIG. 1 combined with two-slot reactant mixer means in place of the mixer means illustrated in FIG. 1.
Figure 3:
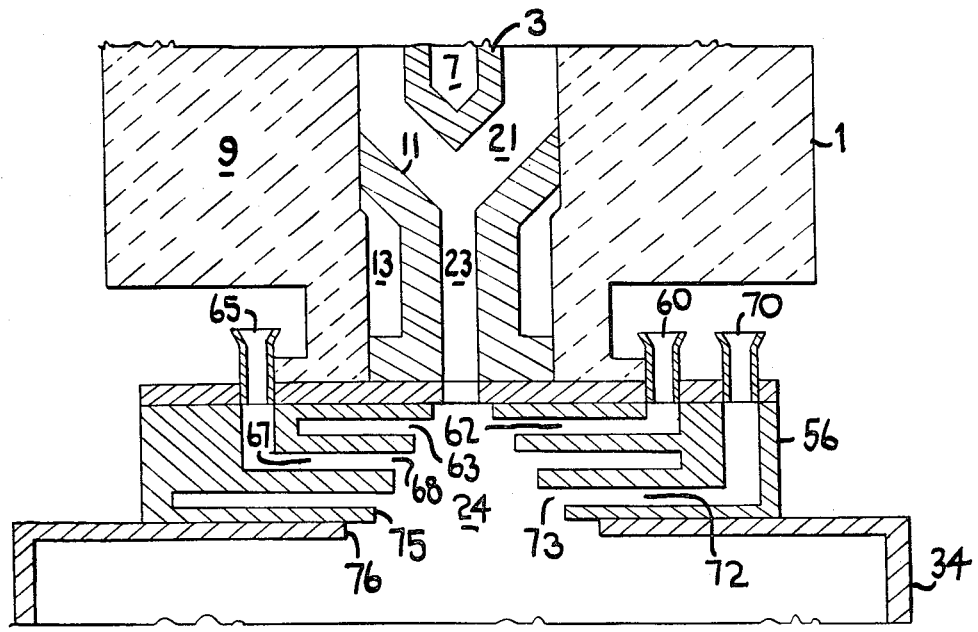
FIG. 3 is a diagrammatic sectional view of the lower portion of the plasma generator and upper portion of the reactor of FIG. 1 combined with three-slot reactant mixer means in place of the mixer means illustrated in FIG. 1.

Reactant mixer means 30 is intimately associated with cylindrical base 9 and comprises opposing conduit means 29 and 31 which abut and lie between the coaxial exit outlets 23 and 27. Conduit tubes 29 and 31 are opposite one another a distance of 180°, although they may be otherwise located, e.g., from 120° to 180°. The flow path of the reactants introduced through tubes 29 and 31 can be radial, tangential or at any suitable angle therebetween into the downwardly directed flame of plasma gas. If desired, these tubes can be positioned downwardly or upwardly at an angle of from 1° to 90° from the horizontal position shown so that the reactant gas flow is directed at such angle into or in contact with or parallel to the stream of hot gas emanating from the plasma generator. As shown, tubes 29 and 31 are on substantially the same horizontal plane; however, such tubes can be offset vertically, i.e., on different horizontal planes, such as, for example, as shown in FIGS. 2 and 3 so as to practice the process of the present invention. Either reactant can be introduced into the heated plasma gas through tubes 29 and 31 when such tubes are on the same horizontal plane as shown in FIG. 1.

Typically, hydrogen is used as the gas which is heated by the plasma generator. This is advantageous since it insures the establishment of a reducing atmosphere and serves as a halogen, e.g., chlorine, acceptor, removing the halogen from the titanium halide and any halocarbon compound used as hydrogen chloride. Mixtures of hydrogen with other gases, such as the noble gases, e.g., argon or helium, or the noble gases alone can also be employed as the plasma gas. The principal function of the plasma gas is to provide heat for the vapor phase reduction reaction and, therefore, the plasma gas need only contain sufficient enthalpy (heat content) to initiate and/or maintain the reaction.

As the heated hydrogen-containing plasma gas stream moves past the zone of reactant introduction 22, it aspirates the titanium halide and carbon source reactants into exit conduit 27. The resulting gaseous mixture is then swept into the interior of reactor 34 resulting in a flame which is downwardly directed and extending a substantial distance, for example, 2 – 6 inches, into the interior of reactor 34. Typically, the reactants and reaction mixture are in turbulent flow although laminar flow could be used.

As shown in FIG. 1, finely-divided titanium carbide product suspended in product gases, as well as excess reactant gas, hereinafter collectively referred to as product gases or other equivalent terms, is removed from reactor 34 through conduit 36 and introduced into cyclone 38 in order to separate the solid titanium carbide product from the product gases. As shown, the discharge from conduit 36 is introduced tangentially into cyclone 38. The heavier titanium carbide particles precipitate out into receiver 42 while gaseous effluent leaves cyclone 38 through conduit 40 and into solids separation chamber 44 in which there is disposed a bag filter 46, electrostatic precipitator or other convenient means for separating suspended solids from a gas. Separation chamber 44 also has an exit or exhaust 50 at its upper portion on the opposite side of the bag filter. As shown, the bag filter has engaged therewith a suitable shaking means 48 to clear the filter of titanium carbide.

In carrying out the process described herein with the assemblage described in connection with FIG. 1, a hydrogen-containing gas is introduced into plasma arc generator 1 through conduit 17 from whence it is directed by means of annular conduit 19 into the space 21 between cathode 3 and anode 11. An electric arc is established between said anode and cathode and as the arc passes through the hydrogen-containing gas, the gas is heated to temperatures typically in excess of 1,500° C. The heated hydrogen-containing gas is projected linearly into reactor 34 past reactant introduction zone 22 formed by the lower lip of anode 11, the upper lip of nozzle 25 and the exit orifices of tubes 29 and 31. Reactant gases, titanium halide and carbon source are introduced through reactant tubes 29 and 31 (either as a mixture or separately) and into the environment of the downwardly flowing stream of hot plasma gas. The reactant gases can be introduced at a mass velocity such that they are aspirated by the movement of the projected plasma stream or, they can be introduced into the hot hydrogen-containing stream at a mass velocity such that the hot hydrogen-containing stream is momentarily constricted.

Titanium carbide suspended in reactor effluent product gas is removed from reactor 34, separated in cyclone 38 and recovered from receiver 42. Product gas, substantially devoid of its titanium carbide content, is removed into gas separation chamber 44 where it is treated to free it from any remaining suspended titanium carbide. The product gas now removed of its titanium carbide and/or other solids burden can be further treated to remove its noxious components, such as HCl, before being burned or discharged to the atmosphere.

Referring now to FIG. 2, wherein like numerals indicate like parts, there is shown a partial assembly, in section, including the bottom portion of plasma generator 1 and the upper portion of reactor 34 of FIG. 1. Nozzle 25 has been eliminated and in place of reactant mixer means 30, there is shown two-slot reactant mixer means 55. Mixer means 55 comprises two coaxial, longitudinally spaced annular conduits 62 and 67 provided with nozzle means 60 and 65 respectively. As shown, the exit orifice 68 of annular conduit 67 is retracted from the orifice 63 of annular conduit 62 to form a conical reactant introduction zone 24. Nozzle means 60 and 65 are connected to conduits 62 and 67 respectively for introducing gas therein and with gas supply means (not shown). As can be seen in FIG. 2, the heating zone of plasma generator 1 (the zone occupied by the arc) is spaced from the reaction zone located within the interior of reactor 34 but is in the direct line of sight of said reaction zone.

Referring now to FIG. 3, there is shown a partial assembly, in cross section, similar to that of FIG. 2, except that three-slot reactant mixer means 56 instead of two-slot mixer means 55 is shown. In addition to annular conduits 62 and 67, there is shown a coaxial, annular conduit 72 which is spaced longitudinally from annular conduits 62 and 67. The exit orifice 73 of conduit 72 is retracted from that of conduit 67 to further extend conical reactant introduction zone 24. Annular conduit 72 is connected to nozzle means 70 for introducing gas into said conduit which, in turn, is connected to gas supply means (not shown).

Reactant mixer means 55 and 56 can be constructed of any suitable material, such as graphite, molybdenum, refractory or any other material which will withstand the heat and corrosive environment present in the reactant introduction zone 24.

In accordance with the present process, titanium halide reactant is introduced into a projected stream of heated hydrogen-containing gas at a point upstream from the point at which carbon source reactant is introduced into said stream. Referring to the apparatus shown in FIG. 2, titanium halide reactant, preferably as a vapor, is introduced to nozzle 60 from a source not shown into annular conduit 62 while the carbon source, e.g., hydrocarbon or halogenated hydrocarbon, also preferably in the vapor state, is introduced through nozzle 65 from a source not shown into annular conduit 67. Both reactants are thereby brought successively into contact with the perimeter of the hot hydrogen-containing gas emanating from exit conduit 23.

In FIG. 3, with the addition of a third annular slot, various alternative combinations of reactant introduction are possible. Thus, if titanium halide reactant is introduced into the hot hydrogen-containing stream through the top slot of mixer 56, i.e., annular conduit 62, then the carbon source reactant can be introduced through either the middle (67) or bottom (72) slot or conduit. Whichever slot in reactant mixer means 56 is not used for introducing the carbon source reactant, can be used for the introduction of auxiliary or sheath gas. When the auxiliary gas is introduced through the middle slot, it serves as a sheath between the titanium halide and carbon source reactant. When the auxiliary gas is introduced through the bottom slot, it acts as a sheath for exposed surfaces, such as the bottom lip 75 of reactant mixer means 56 and the upper lip 76 of reactor 34. If the titanium halide is introduced through the middle slot, then carbon source reactant is introduced through the bottom slot and, if desired, auxiliary gas is introduced through the top slot of the reactant mixer means 56. Although only two and three-slot mixers are shown, mixer means containing additional slots, i.e., more than three, can be used. For example, a five-slot mixer is contemplated wherein auxiliary gas is introduced through the top and bottom slots, titanium halide and carbon source reactant are introduced through the second and fourth slots and auxiliary gas through the third slot.

The flow path of reactants and auxiliary gas through conduits 62, 67 and 72, into reactant introduction zone 24 can be radial, tangential or at any suitable angle therebetween. If desired, such conduits can be positioned downwardly or upwardly at an angle of from 1° to 90° from the horizontal position shown so that the reactant or auxiliary gas flow is directed at such angle into or in contact with or parallel to the stream of hot hydrogen-containing gas flowing into reactor 34.

Auxiliary gases employed in the present process can be any gas which is compatible with the chemical reactions occurring within the reactor. Typically, such gas will be inert and non-reactive with respect to the reactants and reaction products. Exemplary of auxiliary gases that are contemplated for use in the present process include: hydrogen chloride, the noble gases, such as argon, helium and neon, carbon dioxide, carbon monoxide, and mixtures thereof, such as hydrogen and argon. Preferably, hydrogen, is used because of the compatibility of such gas with the gaseous environment and the elimination of a further gas separation step to recover the auxiliary gas, such as when a dissimilar auxiliary gas is used. While hydrogen may be considered chemically reactive (non-inert) because it can function as a reducing agent for the titanium halide reactant, it has been found that it is also suitable for use as an auxiliary gas in the present process.

The auxiliary gas is introduced into the reactor at temperatures below reaction (carbide forming) temperatures, usually from 15° to 200° C., and preferably at room temperature. It is, therefore, to be distinguished from the arc gas, especially when the auxiliary gas and arc gas are the same, such as is possible in the case of hydrogen. The amount of auxiliary gas used in the present process can vary from 1 to 100 moles per mole of titanium halide. When hydrogen is not used as the arc gas but is used as an auxiliary gas and as the reducing agent, the amount of hydrogen used as auxiliary gas will be that quantity over and above that required stoichiometrically by the equation recited hereinabove.

The auxiliary gas is introduced into the reactor and thence into the reaction zone in any convenient manner. For example, it can be introduced along with the reactants as a carrier gas; as a shroud or sheath gas interposed between the reactant inlet ports; or as a separate stream. It can be introduced through the walls of a porous reactor when that particular feature is used. Combinations of the aforementioned methods can also be used. The auxiliary gas should not be introduced as a portion of the arc gas.

The mixture of auxiliary gas, e.g., hydrogen, (if present) arc gas, and reactants swept into the interior of reactor 34 can be thus forwarded in either laminar or turbulent gas flow. Preferably, the flow of gas into the reactor will be turbulent in nature so as to produce a well-stirred reactor rather than one in which the flow of reactants through the reactor is characterized by plug flow.

Reactor 34 is typically cooled so that the reactant mixture is quenched to a temperature at which little or no reversion of the reaction can take place. Thus, cooling of the reaction mixture to below 1,000° C. takes place usually in less than one second and in any event less than ten seconds after the gas leaves the vicinity of the plasma flame.

The present process is more particularly described in the following examples which are intended as illustrative only since numerous modifications and variations therein will be apparent to those skilled in the art.

In the following examples, volumes of gas are expressed in cubic feet per hour at standard conditions (14.7 pounds pressure and 70° F.) or SCFH. Equipment similar to that represented in FIGS. 2 and 3 was used. The arc heater was a medium voltage, medium amperage heater having a power input of 26 kilowatts. The heater operated with an efficiency of about 58 percent at an impedance of 1.32 ohms.

EXAMPLE I

Run A

Hydrogen at a rate of 300 standard cubic feet per hour (SCFH) was introduced into and heated by the medium voltage, medium amperage heater described above. The stream of hot hydrogen was projected past a two-slot mixer similar to that shown in FIG. 2. The velocity of the hot hydrogen stream aspirated reactant gas from their respective inlet ports, thereby drawing the reactants into the reaction zone located within the interior of the reactor. Titanium tetrachloride in an amount of 18.4 grams per minute, together with 10 SCFH hydrogen were introduced into the bottom slot of the mixer. 1,1,2-trichloroethane in an amount calculated to be equal to 124 percent stoichiometric excess (based on titanium tetrachloride), together with 45 SCFH hydrogen were introduced into the top slot of the mixer. The titanium carbide produced was recovered and found to have a BET surface area of about 4.3 square meters per gram ($m^2$/gram).

Run B

The apparatus and procedure of Run A were repeated except that the titanium tetrachloride reactant stream was introduced through the top slot of the reactant mixer and the 1,1,2-trichloroethane reactant stream was introduced through the bottom slot. The titanium tetrachloride feed rate was 16.7 grams per minute. The amount of excess 1,1,2-trichloroethane remained at 124 percent. The titanium carbide product produced was recovered and found to have a BET surface area of about 11.0 $m^2$/gram.

Run C

The procedure of Run A was repeated except that the titanium tetrachloride and 1,1,2-trichloroethane were admixed and introduced into the bottom slot of the mixer, together with 10 SCFH hydrogen. The titanium tetrachloride feed rate was 18.6 grams per minute, and the 1,1,2-trichloroethane stoichiometric excess was about 111 percent. 45 SCFH hydrogen was introduced through the top slot of the mixer. The titanium carbide product produced was recovered and found to have a BET surface area of 4.6 $m^2$/gram.

EXAMPLE II
Run A

Apparatus similar to FIG. 3 was employed. Hydrogen at a rate of 300 SCFH was introduced into and heated by the arc heater described in Example I. The resulting stream of hot hydrogen was projected past a three-slot mixer and into the interior of the reactor. Titanium tetrachloride in an amount of 18.5 grams per minute, together with 10 SCFH hydrogen was introduced into the hot hydrogen stream through the bottom slot of the three-slot mixer. 45 SCFH hydrogen as a sheath gas was introduced through the middle slot and 1,1,2-trichloroethane in an amount equal to 65.4 percent stoichiometric excess, based on titanium tetrachloride, together with 45 SCFH hydrogen was introduced through the top slot of the mixer. The titanium carbide product produced was recovered and found to have a BET surface area of 21 m²/gram.

Run B

The procedure of Run A was repeated except that the titanium tetrachloride, together with 45 SCFH hydrogen, was introduced through the top slot of the mixer while 1,1,2-trichloroethane, together with 10 SCFH hydrogen, was introduced through the bottom slot of the mixer. 45 SCFH hydrogen as a shroud was introduced through the middle slot. The percent excess 1,1,2-trichloroethane was calculated to be about 55 percent. The titanium carbide product produced was recovered and found to have a BET surface area of 26 m²/gram.

The data of Examples I and II show that the surface area of titanium carbide is increased when the titanium halide reactant is permitted to contact the hot hydrogen stream prior to the point at which the carbon source reactant contacts the hot hydrogen stream. Thus, the successive introduction of titanium halide and carbon source reactant provides a means for producing titanium carbide having a surface area larger (and thus a particle size smaller) than when the sequence of reactant introduction is reversed or when the reactants are introduced simultaneously into the hydrogen stream. The slight differences in reactant feed rates reported in the above comparative examples are within the accuracy of the rotometers used to meter the reactants. From the experimental data accumulated in the present work, such differences have not been observed to have any significant effect on the BET surface area of the TiC product.

The surface area of submicron titanium carbide is a function of the particle size of the titanium carbide particle, i.e., the smaller the particle, the higher the surface area. The weight average particle size in microns of the titanium carbide particles produced in the above examples can be calculated approximately by the expression:

Particle size wt. average = 1.25/BET

Applying the aforesaid expression to Examples I and II, it can be observed that the particle size of the titanium carbide dropped from 0.29 to 0.11 (Run A versus Run B) and from 0.06 to 0.05 in Example II.

The titanium carbide produced by this invention is a powder in the form of small black cubic crystals. Most of the particles produced were in the range of from 0.05 to 0.30 micron. This is an advantageous particle size range since it is neither too large nor too small. TiC in larger particle size range, e.g., 1 – 4 micron, must be milled for many hours in order to provide a product which may be usefully dispersed in tool faces of cutting tools. The smaller particle size range of the product produced according to the present invention permits a more thorough distribution of the TiC in tool face material, such as molybdenum, cobalt or nickel, for cutting tools, dies, and the like. Furthermore, the relatively narrow range of these small particle sizes permits more ready use of these materials as effective polishing powders, abrasive polishers, pigments, or on sandpapers.

At the same time, the TiC produced according to this invention is not excessively small. This is important since products which are predominantly lower in particle size than 0.03 micron are so small that they cannot effectively be used in polishing or cutting tools or related operations to gain optimum advantage of the intrinsic hardness of TiC.

Although the present process has been described with reference to specific details of certain embodiments thereof, it is not intended that such details should be regarded as limitations upon the scope of the invention except as and to the extent that they are included in the accompanying claims.

I claim:

1. In the process of producing titanium carbide by the vapor phase reaction of titanium halide and a volatile carbon source selected from the group consisting of $C_1 - C_{12}$ hydrocarbons, halogenated hydrocarbons and mixtures of such compounds in a reactor at titanium carbide forming temperatures, the improvement which comprises projecting a stream of hydrogen-containing gas into said reactor, introducing reactants titanium halide and volatile carbon source against said stream of hydrogen-containing gas, said titanium halide being introduced against said hydrogen stream upstream of the point of introduction of said volatile carbon source and removing titanium carbide from said reactor.

2. The process of claim 1 wherein said titanium halide is titanium tetrachloride.

3. The process of claim 1 wherein said hydrogen-containing gas has a temperature of from about 1,500° C. to about 4,000° C.

4. The process of claim 3 wherein said hydrogen-containing gas has been heated by a plasma generator.

5. In the process of producing titanium carbide by the vapor phase reaction of titanium tetrachloride and a volatile carbon source selected from the group consisting of $C_1-C_{12}$ hydrocarbons, halogenated hydrocarbons and mixtures of such compounds in a reactor at titanium carbide forming temperatures, the improvement which comprises projecting a stream of hydrogen-containing gas into said reactor, introducing reactants titanium tetrachloride and volatile carbon source against said stream of hydrogen-containing gas, said titanium tetrachloride being introduced against said hydrogen stream upstream of the point of introduction of said volatile carbon source, and removing titanium carbide from said reactor.

6. The process of claim 5 wherein said hydrogen-containing gas is hydrogen.

7. The process of claim 5 wherein said carbon source is 1,1,2-trichloroethane.

8. The process of claim 5 wherein said hot hydrogen-containing gas has a heat content which is sufficient to maintain said reaction.

* * * * *

UNITED STATES PATENT OFFICE
CERTIFICATE OF CORRECTION

Patent No. 3,761,576             Dated September 25, 1973

Inventor(s) Franklin E. Groening

It is certified that error appears in the above-identified patent and that said Letters Patent are hereby corrected as shown below:

Column 7, line 25, cancel "hydrogen chloride" and substitute --hydrogen, chlorine,--

Signed and sealed this 29th day of October 1974.

(SEAL)
Attest:

McCOY M. GIBSON JR.            C. MARSHALL DANN
Attesting Officer             Commissioner of Patents